(12) United States Patent
Boland

(10) Patent No.: US 8,984,707 B2
(45) Date of Patent: Mar. 24, 2015

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1535 days.

(21) Appl. No.: 12/307,460

(22) PCT Filed: Jun. 28, 2007

(86) PCT No.: PCT/EP2007/056463
§ 371 (c)(1),
(2), (4) Date: Oct. 1, 2009

(87) PCT Pub. No.: WO2008/003633
PCT Pub. Date: Jan. 10, 2008

(65) Prior Publication Data
US 2010/0011528 A1 Jan. 21, 2010

(30) Foreign Application Priority Data
Jul. 4, 2006 (EP) ..................................... 06116570

(51) Int. Cl.
*B60S 1/40* (2006.01)
*B60S 1/38* (2006.01)

(52) U.S. Cl.
CPC ............. *B60S 1/4038* (2013.01); *B60S 1/3862* (2013.01); *B60S 1/3806* (2013.01); *B60S 1/3848* (2013.01); *B60S 1/3849* (2013.01); *B60S 2001/4054* (2013.01)
USPC .................. 15/250.201; 15/250.32; 15/250.43

(58) Field of Classification Search
USPC ............................. 15/250.32, 250.43, 250.44, 15/250.451–250.454, 250.04, 250.361, 15/250.31, 250.201
See application file for complete search history.

(56) References Cited

U.S. PATENT DOCUMENTS

| 2,694,827 | A  | * | 11/1954 | Bacher ........................ | 15/250.32 |
| 6,279,191 | B1 | * | 8/2001  | Kotlarski et al. ........ | 15/250.201 |
| 6,634,055 | B1 | * | 10/2003 | De Block ................... | 15/250.32 |
| 7,523,522 | B2 | * | 4/2009  | Herring et al. ............. | 15/250.32 |

FOREIGN PATENT DOCUMENTS

| DE | 19854307 A1 | 5/2000 |
| DE | 10340140 A1 | 3/2005 |
| DE | 102004012867 A1 | 10/2005 |
| DE | 102004056835 A1 | 6/2006 |
| EP | 1403156 A | 3/2004 |
| FR | 2866298 A | 8/2005 |

* cited by examiner

*Primary Examiner* — Gary Graham
(74) *Attorney, Agent, or Firm* — Robert L. Stearns; Dickinson Wright, PLLC

(57) ABSTRACT

Windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper device comprises a connecting device for an oscillating arm, wherein said oscillating arm is pivotally connected to said connecting device about a pivot axis near a free end thereof, with the special feature that said connecting device comprises a water channel for transporting water therethrough from a first side of said connecting device facing away form said free end of said oscillating arm to a second side of said connecting device facing towards said free end of said oscillating arm.

15 Claims, 6 Drawing Sheets

WINDSCREEN WIPER DEVICE

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of the longitudinal strips are interconnected by a respective connecting piece, which windscreen wiper device comprises a connecting device for an oscillating arm, wherein the oscillating arm is pivotally connected to the connecting device about a pivot axis near a free end thereof.

2. Related Art

Such a windscreen wiper device is known from European patent publication no. 1 403 156 of the same Applicant. This prior art windscreen wiper device is designed as a "yokeless" wiper device, wherein no use is made of several yokes pivotally connected to each other, but wherein the wiper blade is biassed by the carrier element, as a result of which it exhibits a specific curvature. In this prior art windscreen wiper device a joint part interposed between the connecting device and the oscillating arm comprises at least one resilient tongue engaging in a correspondingly shaped hole provided in the oscillating arm, wherein the resilient tongue is rotatable along an hinge axis between an outward position retaining the wiper blade onto the oscillating arm and an inward position releasing the wiper blade from the oscillating arm. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

SUMMARY OF THE INVENTION

The object of the invention is to provide a improved windscreen wiper device, particularly in the sense that measures are taken to prevent especially rain water accumulating near the connecting device thus leaving rain droplets on the windscreen after each oscillatory movement of the oscillating arm.

In order to accomplish that objective, a windscreen wiper device of the type referred to in the introduction is characterized according to the invention in that the connecting device comprises a water channel for transporting water therethrough from a first side of the connecting device facing away from the free end of the oscillating arm to a second side of the connecting device facing towards the free end of the oscillating arm. In use, during each oscillatory movement of the oscillating arm, rain water will be pressed from the first side where rain water accumulates, through the water channel, to the second side in order to be wiped away as a result of the oscillatory movement of the oscillating arm. Particularly, the rain water will accumulate on the surface of a spoiler on the wiper blade at the first side, and will subsequently be pressed from the first side through the water channel to the second side.

It is noted that the present invention is not restricted to the use of two longitudinal strips forming the elastic, elongated carrier element. Instead, the carrier element may comprise only one longitudinal strip, that is particularly located in a central channel of the wiper blade.

In a preferred embodiment of a windscreen wiper device in accordance with the invention the water channel extends in longitudinal direction of the connecting device.

In another preferred embodiment of a windscreen wiper device according to the invention in use the water channel allows water to be transported therethrough from the first side of the connecting device having an over pressure relative to the environment to the second side of the connecting device having an under pressure relative to the environment.

In another preferred embodiment of a windscreen wiper device in accordance with the invention the water channel has outer ends with a non-closed circumference.

In another preferred embodiment of a windscreen wiper device according to the invention the circumference of the outer ends are closed by a spoiler on the elongated wiper blade.

That is, in use during rain, water will be pressed along the spoiler, from a first outer end of the water channel near the first side of the connecting device, through the water channel, to a second outer end of the water channel near the second side of the connecting device, whereinafter the rain water will be guided along the spoiler in order to be swept away by the oscillatory movement of the oscillating arm. Particularly, the rain water will accumulate on the surface of a spoiler on the wiper blade at the first side, and will subsequently be pressed from the first side through the water channel to the second side.

In another preferred embodiment of a windscreen wiper device in accordance with the invention the oscillating arm is pivotally connected to the connecting device about the pivot axis near the free end thereof, with the interposition of a joint part.

In another preferred embodiment of a windscreen wiper device according to the invention the joint part is detachably and pivotally connected to the connecting device by pivotally engaging protrusions of the connecting device, at the location of the pivot axis, in recesses provided in the joint part. The connecting device acts as a base part, wherein the connecting device is preferably fixedly connected to the longitudinal strips through a welding,—brazing ("soldering"), glueing or clamping operation. The connecting device is a universal connection part for each type of interconnection between the wiper blade and the oscillating arm. A different type of the joint part to be connected to the connecting device may be used for each different type of interconnection between the wiper blade and the oscillating arm. The advantage thus achieved is that a unit consisting of the wiper blade and the connecting device connected to the longitudinal strips can be manufactured for each and every type of interconnection between the wiper blade and the oscillating arm, while only a relatively cheap and easy to manufacture joint part to be connected to the connecting has to correspond with a specific type of interconnection between the wiper blade and the oscillating arm. Thus, a universal connection between the wiper blade and the oscillating arm is obtained, so that car drivers are given the possibility to buy also non-original cheap wiper blades fitting the original oscillating arms on their cars. The joint part may be connected to the connecting device through a snapping/clipping operation.

It is noted that the protrusions that function as bearing surfaces are spaced far apart, so that the forces exerted thereon will be relatively low.

In another preferred embodiment of a windscreen wiper device in accordance with the invention the joint part has an at least substantially U-shaped cross-section at the location of its connection to the connecting device, wherein the joint part in each leg of the U-shaped cross-section is provided with a recess provided coaxially with the pivot axis. More in particular, the protrusions extend outwards on either side of the connecting device, wherein the protrusions are at least substantially cylindrical. In the alternative, the protrusions are at least substantially spherical or frusto-conical.

In another preferred embodiment of a windscreen wiper device according to the invention the joint part comprises at least one resilient tongue engaging in a correspondingly shaped hole provided in the oscillating arm, wherein the resilient tongue is rotatable along a hinge axis between an outward position retaining the wiper blade onto the oscillating arm and an inward position releasing the wiper blade from the oscillating arm. The hinge axis is particularly located near an inner edge of the joint part. In the alternative the hinge axis is located near an outer edge of the joint part, as described in European patent application no. 04103735.9 of the same Applicant—In the latter case the resilient tongue is forced in the outward position under the influence of a moment in case a force is exerted on the wiper blade in a direction away from the oscillating arm. Particularly, the counterforce exerted by the oscillating arm on the resilient tongue engages at a point located behind the hinge axis, seen in the direction of the force exerted on the wiper blade. In other words, the moment of force ensures in a natural way that the resilient tongue is forced automatically in its outward position, that is its position retaining the wiper blade onto the oscillating arm. On the contrary, in the above-mentioned European patent publication no. 1 403 156 of the same Applicant the moment during use compels the resilient tongue to automatically take its inward position, thereby releasing the wiper blade from the oscillating arm, with all negative consequences involved.

In another preferred embodiment of a windscreen wiper device in accordance with the invention the oscillating arm has an at least substantially U-shaped cross-section at the location of its connection to the joint part, wherein the hole is provided in a base of the U-shaped cross-section. In addition thereto or in the alternative the joint part comprises at least two lateral resilient tongues extending outwardly, wherein the oscillating arm has an at least substantially U-shaped cross-section at the location of its connection to the joint part, and wherein each tongue engages in a correspondingly shaped hole provided in a leg of the U-shaped cross-section. The hole(s} has/have a closed circumference. Such (a) closed hole(s) enhance(s) the retention of the connection device/joint part onto the oscillating arm in all possible directions, particularly both horizontally and vertically. In the alternative, the hole(s) has/have a non-closed circumference.

Further, it is noted that the present invention is not restricted to the use with passenger cars, but it can also be—1—used with trains and other fast vehicles.

BRIEF DESCRIPTION OF THE DRAWINGS

The invention will now be explained in more detail with reference to figures illustrated in a drawing, wherein.

DETAILED DESCRIPTION

Figure 1:
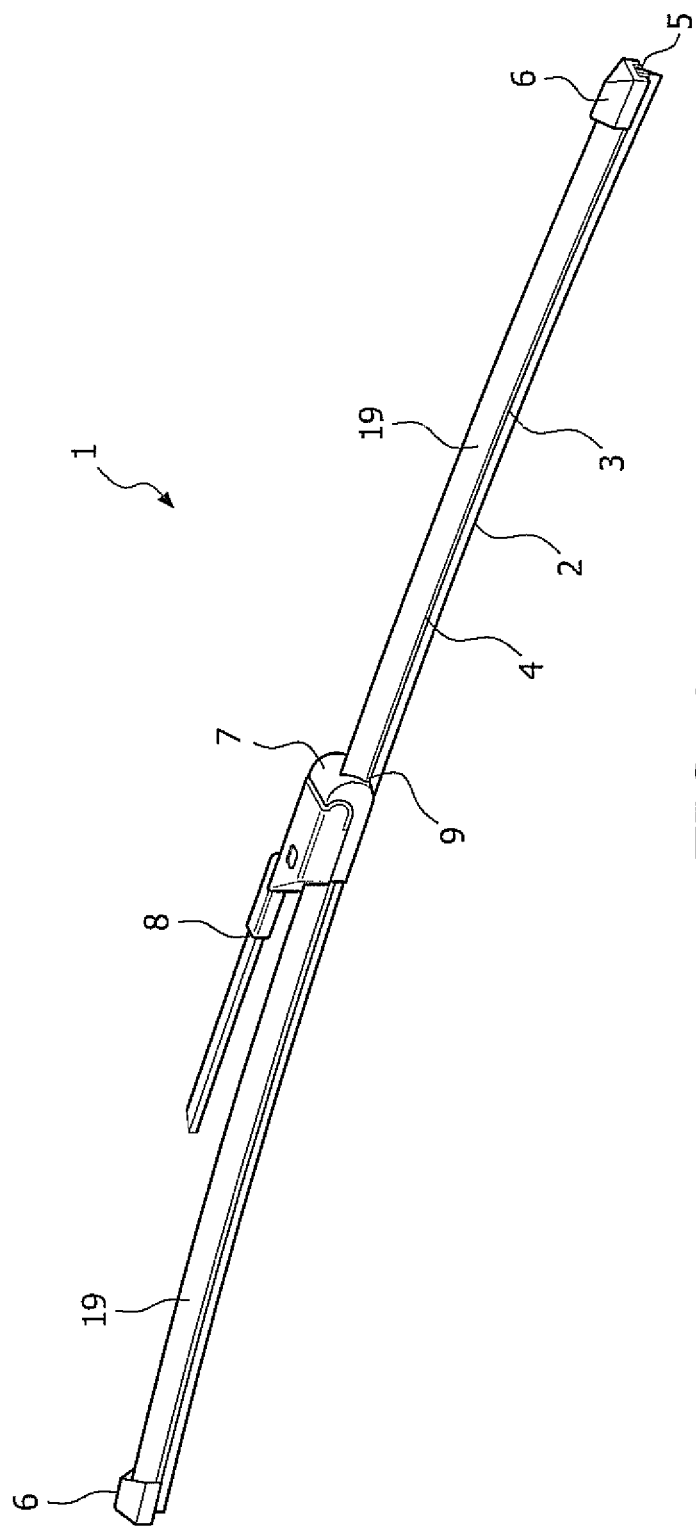
FIG. 1 is a perspective, schematic view of a preferred embodiment of a windscreen wiper device in accordance with the invention.

FIG. 1 shows a preferred variant of a windscreen wiper device 1 according to the invention. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the wiper blade 2, as it were, which is thus biased in a curved position (the curvature in operative position being that of a windscreen to be wiped}. Neighbouring ends 5 of the strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having a positive fit") or force-locked to the ends 5 of the strips 4. In another preferred embodiment, the connecting pieces 6 are in one piece with the strips 4 made of spring band steel. In the latter case the connecting pieces 6 form transverse bridges for the strips 4, as it were.

The windscreen wiper device 1 is furthermore built up of a connecting device 7 of plastic material for an oscillating arm 8. Alternatively, the connecting device 7 may also be made of metal, such as steal or aluminum. The connecting device 7 comprises clamping members 9 that are integral therewith, which engage round longitudinal sides of the strips 4 that face away from each other, as a result of which the connecting device 7 is firmly attached to the unit consisting of the wiper blade 2 and the strips 4. The oscillating arm 8 is pivotally connected to the connecting device 7 about a pivot axis near one end, as will be described hereunder.

Figure 2:
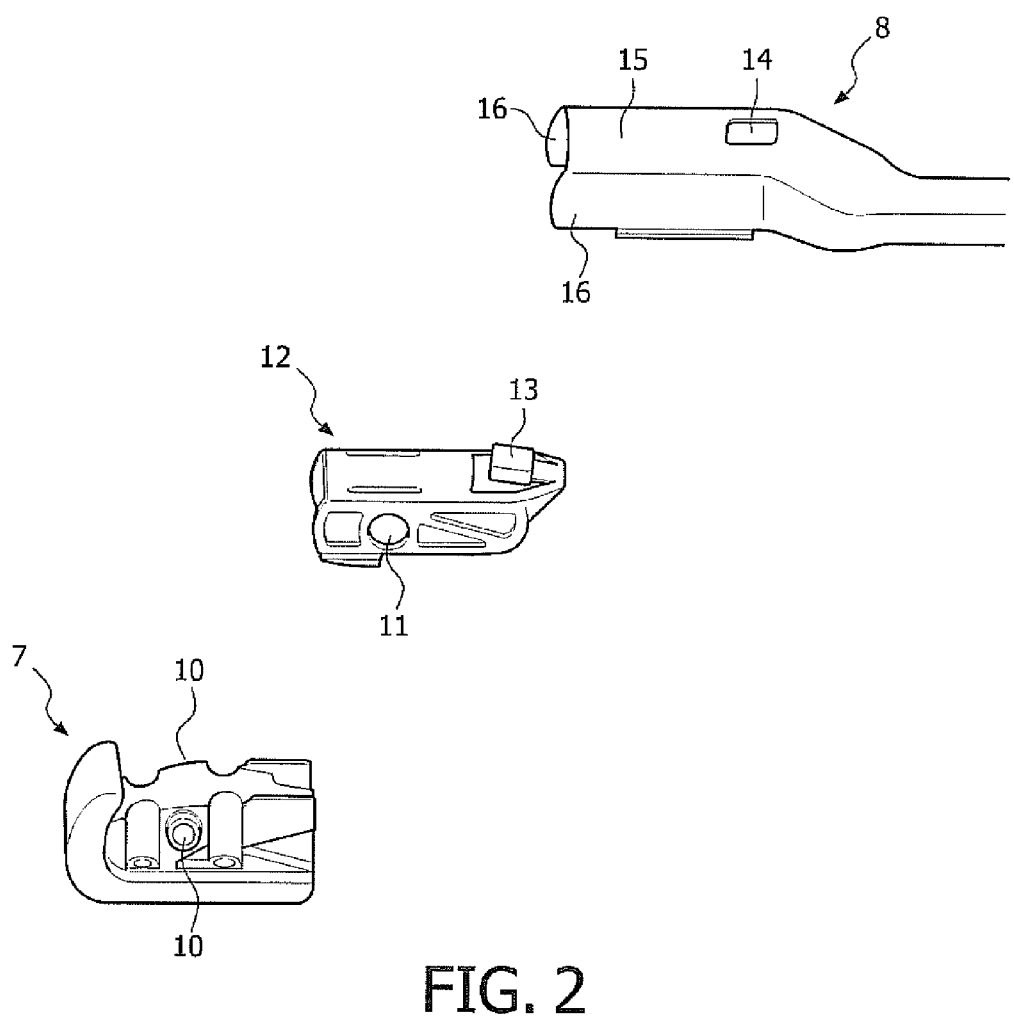
FIG. 2 is a perspective, schematic view of a connecting device as used in FIG. 1, as well as a joint part and (an end of} a oscillating arm according to another preferred embodiment in accordance with the invention.

With reference to FIG. 2 the connecting device 7 comprises two cylindrical protrusions 10 extending outwards on either side of the connecting device 7. These protrusions 10 pivotally engage in identically shaped cylindrical recesses 11 of a plastic joint part 12. In the alternative the recesses 11 may have a non-closed shape (i.e. open~Q-circumference). The protrusions 10 act as bearing surfaces at the location of a pivot axis in order to pivot the joint part 12 (and the oscillating arm 8 attached thereto} about the pivot axis near one end of the oscillating arm 8. The protrusions 10 are preferably in one piece with the connecting device 7; in the alternative, the protrusions 10 are part of a single pivot pin perpendicular to the connecting device 7. The connecting device 7 may be equipped with a cover or cap in order to obtain an aesthetic appearance thereof, to avoid sharp edges and to provide protection against UV-light etcetera. The joint part 12 comprises one resilient tongue 13 extending outwardly, while the oscillating arm 8 has an U-shaped cross-section at the location of its connection to the joint part 12, so that the tongue 13 engages in an identically shaped hole 14 provided in a base 15 of the U-shaped cross-section.

Figure 3A:
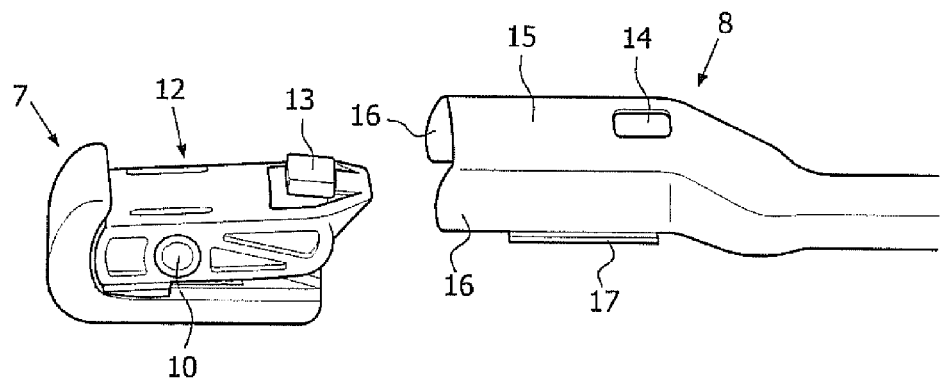
FIG. 3 shows various successive steps for fitting the connecting device, the joint part and the oscillating arm of FIG. 2 together.
Figure 3B:
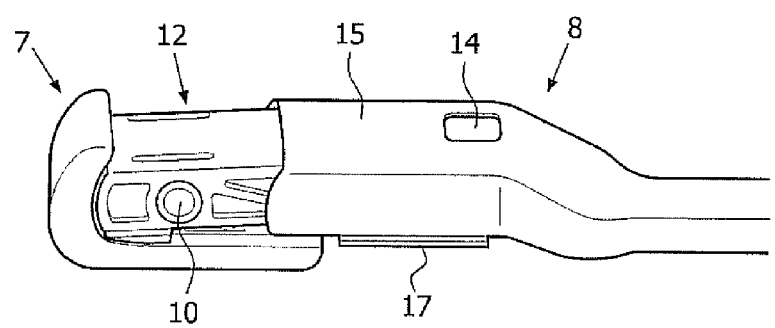
Figure 3C:
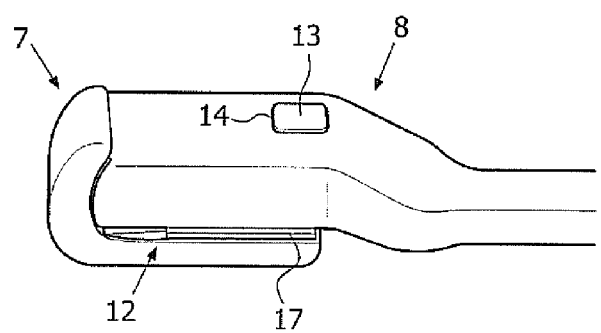

FIG. 3 shows the steps of mounting the connecting device 7 with the wiper blade 2 (not shown) onto the oscillating arm 8. The joint part 12 being already clipped onto the connecting device 7 is pivoted relative to the connecting device 7, so that the joint part 12 can be easily slid on a free end of the oscillating arm 8. During this sliding movement the resilient tongue 13 is initially pushed in against a spring force and then allowed to spring back into the hole 14, thus snapping, that is clipping the resilient tongue 13 into the hole 14. This is a so-called bayonet-connection. The oscillating arm 8 together with the joint part 12 may then be pivoted back in a position parallel to the wiper blade 2 in order to be ready for use. By subsequently pushing in again the resilient tongue 13 against the spring force (as if it were a push button}, the connecting device 7 and the joint part 2 together with the wiper blade 2 (not shown) may be released from the oscillating arm 8. Dismounting the connecting device 7 with the wiper blade 2 (not shown) from the oscillating arm B is thus realized by sliding the connecting device 7 and the joint part 2 together with the wiper blade 2 (not shown} in a direction away from the oscillating arm 8.

Each leg 16 of the U-shaped cross-section of the oscillating arm 8 comprises clamping members formed as inwardly bended edges 17 integral with the legs 16, wherein during use the edges 17 engage round longitudinal sides of the joint part 12 that face away from each other. Thus an enhanced retention of the connecting device 7/joint part 12 onto the oscillating arm 8 is achieved in vertical direction, that is perpendicular to the longitudinal direction of the oscillating arm 8.

Figure 4:
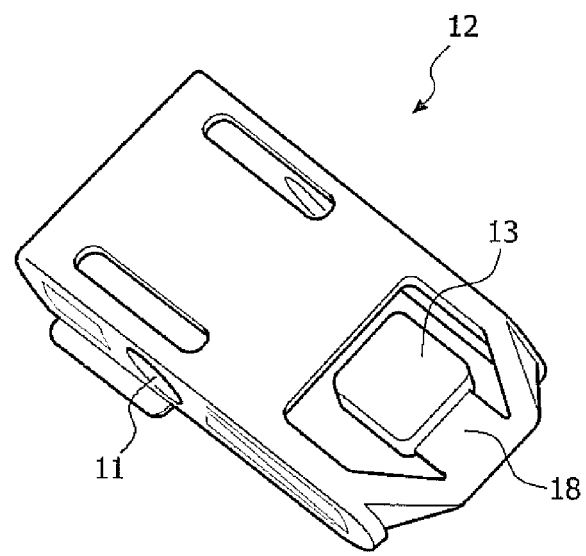
FIGS. 4 and 5 relate to several views of a joint part of FIGS. 2 and 3.
Figure 5:
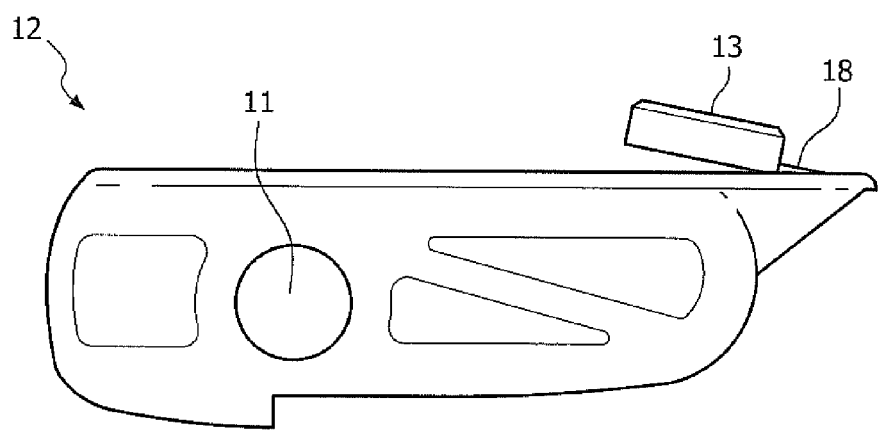

FIGS. 4 and 5 relate to several views of a joint part of FIGS. 2 and 3. The resilient tongue 13 is rotatable along an hinge axis 18 (located near an outer edge of the joint part 12) between an outward position retaining the wiper blade 2 onto the oscillating arm B and an inward position releasing the wiper blade 2 from the oscillating arm 8. The resilient tongue 13 is forced in the outward position under the influence of a moment in case a force is exerted on the wiper blade 2 in a direction away from the oscillating arm 8. Particularly, the counterforce exerted by the oscillating arm 8 on the resilient tongue 13 engages at a point located behind the hinge axis 18, seen in the direction of the force exerted on the wiper blade 2. In other words, the moment of force ensures in a natural way that the resilient tongue 13 is forced automatically in its outward position, that is its position retaining the connecting device 7, the joint part 12 and the wiper blade 2 (not shown) onto the oscillating arm 8. Preferably, a spoiler 19 is furthermore provided (FIGS. 1, 6 and 7).

Figure 6:
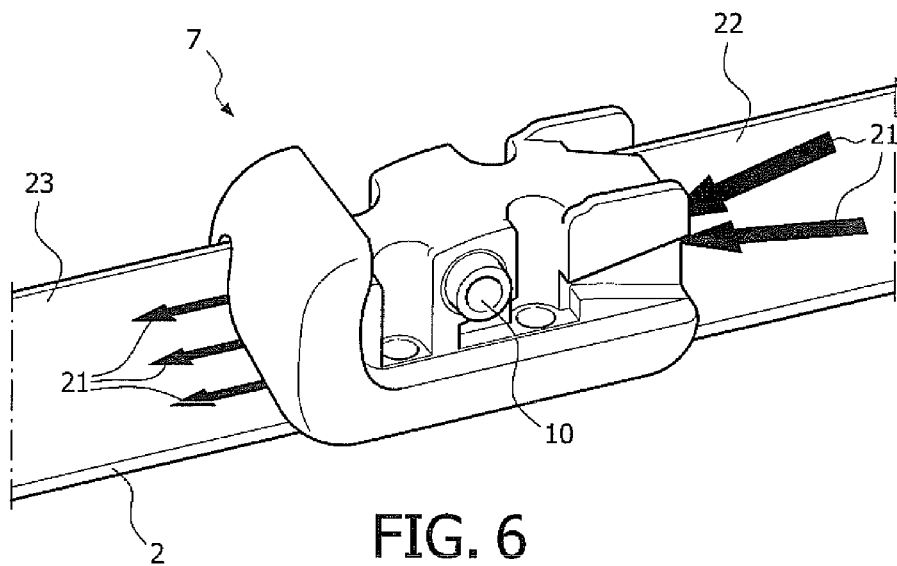
FIGS. 6 through 9 refers to perspective, schematic views of a preferred embodiment of a connecting device of FIG. 2 in a mounted position {FIGS. 6 and 7) and in a dismounted position (FIGS. 8 and 9).
Figure 7:
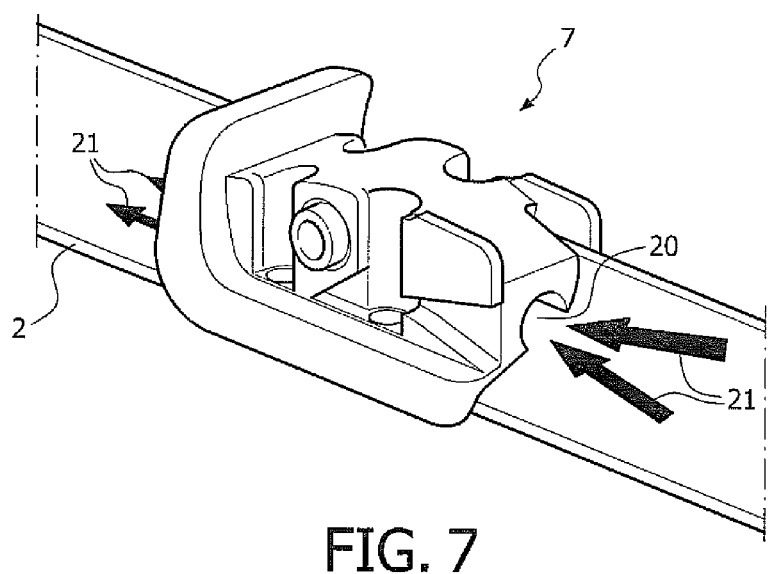
Figure 8:
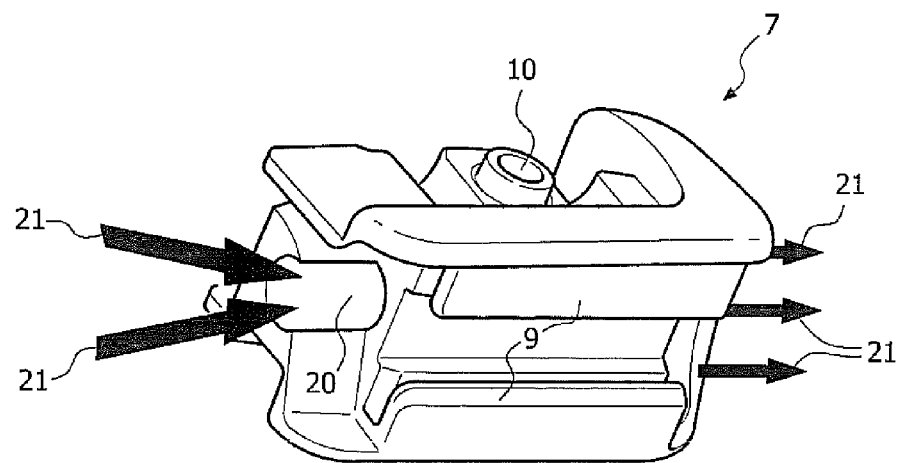
Figure 9:
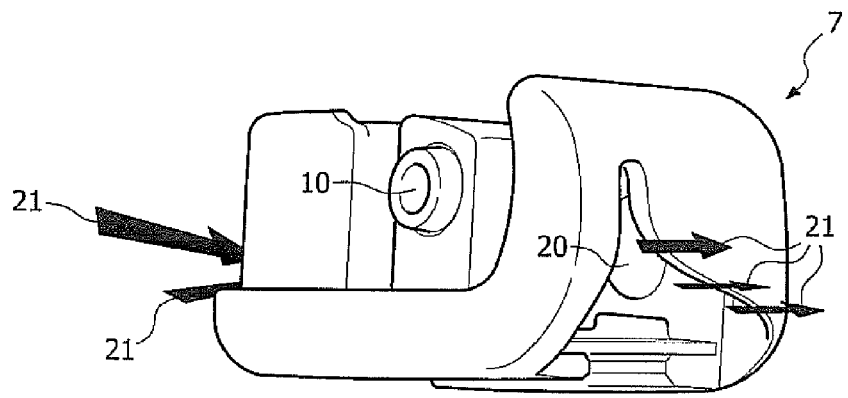

As can be seen from FIGS. 6 through 9, the connecting device 7 is equipped with a water channel 20 extending in longitudinal direction of the connecting device 7. During use the water channel 20 transports rain water therethrough in the direction of the arrows 21. In other words, in use rain water is carried away from a first side 22 of the connecting device 7 facing away from the free end of the oscillating 8 arm to a second side 23 of the connecting device 7 facing towards the free end of the oscillating arm 6. As a result of the oscillatory movement of the oscillating arm 8, in practice an over pressure relative to the environment exists at the location of the first side 22 of the connecting device 7, while an under pressure relative to the environment is present at the location of the second side 23 of the connecting device 7. Due to the over pressure and the under pressure rain water is "automatically" pressed through the water channel 20. With reference to FIGS. 6 and 7 the water channel 20 has an outer end with a non-closed circumference, which in mounted position is closed by the spoiler 19 on the elongated wiper blade 2.

Finally, the following is noted. Usually the oscillating arm 8 comprises a (plastic, for example) mounting head which can be fixed for rotation to a shaft driven, via a mechanism, by a small motor. The oscillating arm 8 further comprises a (plastic, for example) arm member supported by the mounting head, wherein the arm member in turn supports the wiper blade 2 with the help of the connecting device 7, as illustrated in FIG. 1. The arm member is pivotally connected to the mounting head by means of a pivot pin, for example. In use, the shaft rotates alternately in a clockwise and in a counterclockwise sense carrying the mounting head into rotation also, which in turn draws the arm member into rotation and by means of the connecting device 7 moves the wiper blade 2. Thus, the first side 22 is directed towards the shaft, whereas the second side 23 is directed away from the shaft.

The invention is not restricted to the variants shown in the drawing, but it also extends to other embodiments that fall within the scope of the appended claims. As already mentioned, for example, a skilled person would easily understand that the present invention is not necessarily restricted to the use of two longitudinal strips, but may also be applied to only one longitudinal strip, which is preferably inserted in a central channel in the wiper blade.

The invention claimed is:

1. Windscreen wiper device comprising an elastic, elongated carrier element, as well as an elongated wiper blade of a flexible material, which can be placed in abutment with a windscreen to be wiped, which wiper blade included opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, wherein said oscillating arm is pivotally connected to said connecting device about a pivot axis near a free end thereof, which said connecting device comprises a water channel for transporting rain water therethrough from a first side of said connecting device facing away from said free end of said oscillating arm, wherein in use said water channel automatically carries rain water therethrough from said first side of said connecting device having an over pressure relative to the environment to a second side of said connecting device having an under pressure relative to an environment pressure as a result of an oscillatory movement of said oscillating arm, wherein said oscillating arm is pivotally connected to said connecting device about said pivot axis near said free end thereof with the interposition of a joint part, and wherein said joint part is detachable and pivotally connected to said connecting device by pivotally engaging protrusions of said connecting device, at the location of said pivot axis, in recesses provided in said joint part.

2. Windscreen wiper device according to claim 1, wherein said water channel extends in a longitudinal direction of said connecting device.

3. Windscreen wiper device according to claim 1, wherein said water channel has outer ends with a non-closed circumference.

4. Windscreen wiper device according to claim 3, wherein said outer ends are closed by a spoiler on said elongated wiper blade.

5. Windscreen wiper device according to claim 1, wherein said oscillating arm is pivotally connected to said connecting device about said pivot axis near said free end thereof, with the interposition of a joint part.

6. Windscreen wiper device according to claim 5, wherein said joint part is detachably connected to said connecting device through a snapping/clipping operation.

7. Windscreen wiper device according to claim 5, wherein said joint part has an at least substantially U-shaped cross-section at the location of its connection to said connecting device, and wherein said joint part in each leg of said U-shaped cross-section is provided with a recess provided coaxially with said pivot axis.

8. Windscreen wiper device according to claim 5, wherein said joint part comprises at least two lateral resilient tongues extending outwardly, wherein said oscillating arm has an at least substantially U-shaped cross-section at the location of its connection to said joint part, and wherein each tongue engages in a correspondingly shaped hole provided in a leg of said U-shaped cross-section.

9. Windscreen wiper device according to claim 1, wherein the protrusions extend outwards on either side of said connecting device.

10. Windscreen wiper device according to claim 1, wherein said joint part comprises at least one resilient tongue engaging in a correspondingly shaped hole provided in said oscillating arm, and wherein said resilient tongue is rotatable along a hinge axis between an outward position retaining said wiper blade onto said oscillating arm and an inward position releasing said wiper blade from said oscillating arm.

11. Windscreen wiper device according to claim 10, wherein said hinge axis is located near an inner edge of said joint part.

12. Windscreen wiper device according to claim 10, wherein said hinge axis is located near an outer edge of said joint part.

13. Windscreen wiper device according to claim 10, wherein said oscillating arm has an at least substantially U-shaped cross-section at the location of its connection to said joint part, and wherein said hole is provided in a base of said U-shaped cross-section.

14. A windscreen wiper device, comprising:
- an elongated and longitudinally extending wiper blade of a flexible material;
- an elastic and longitudinally extending carrier element operably coupled with said wiper blade for biasing said wiper blade into a curved configuration;
- a connecting device extending between first and second longitudinal ends and operatively coupled with said carrier element;
- a pair of spoiler elements operatively coupled with said carrier element and disposed on opposite sides of said connecting device;
- said connecting device presenting a water channel extending longitudinally between said first and second ends, and wherein at least a portion of said water channel is generally tubular in shape and wherein said water channel opens on said longitudinal ends above said spoiler elements for conveying water from one of said spoiler elements on one side of said connecting device to the other of said spoiler elements; and
- a joint part detachably and pivotally connected with said connecting device by pivotally engaging protrusions of said connecting device at a pivot axis in recesses provided in said joint part.

15. A windscreen wiper device, comprising:
an elastic, elongated carrier element, as well as an elongated wiper blade of a flexible material, which can be placed in abutment with a windscreen to be wiped, which wiper blade included opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, which said connecting device comprises a water channel for transporting rain water therethrough from a first side of said connecting device facing in one longitudinal direction, wherein in use said water channel automatically carries rain water therethrough from said first side of said connecting device having an over pressure relative to the environment to a second side of said connecting device having an under pressure relative to an environment pressure a joint part for interconnecting the oscillating arm with said connecting device, and wherein said joint part is detachable and pivotally connected to said connecting device by pivotally engaging protrusions of said connecting device in recesses provided in said joint part, and further including a pair of spoiler elements on opposite sides of said connecting device and wherein said water channel opens on said first and second sides of said connecting device above said spoiler elements.

\* \* \* \* \*